United States Patent
Au et al.

(10) Patent No.: US 9,127,891 B2
(45) Date of Patent: Sep. 8, 2015

(54) FURNACE VISUALIZATION

(71) Applicant: Honeywell International Inc., Morristown, NJ (US)

(72) Inventors: Kwong Wing Au, Bloomington, MN (US); Sharath Venkatesha, Minnetonka, MN (US); Matthew Martin, Tulsa, OK (US)

(73) Assignee: HONEYWELL INTERNATIONAL, INC., Morristown, NJ (US)

( * ) Notice: Subject to any disclaimer, the term of this patent is extended or adjusted under 35 U.S.C. 154(b) by 240 days.

(21) Appl. No.: 13/938,940

(22) Filed: Jul. 10, 2013

(65) Prior Publication Data
US 2015/0015694 A1 Jan. 15, 2015

(51) Int. Cl.
*F27D 21/02* (2006.01)
*G06T 5/00* (2006.01)

(52) U.S. Cl.
CPC ............... *F27D 21/02* (2013.01); *G06T 5/001* (2013.01)

(58) Field of Classification Search
USPC ........ 382/276, 284, 254, 274; 348/42–43, 83, 348/143
See application file for complete search history.

(56) References Cited

U.S. PATENT DOCUMENTS

| | | | | |
|---|---|---|---|---|
| 6,002,993 A * | 12/1999 | Naito et al. | | 702/154 |
| 6,229,563 B1 * | 5/2001 | Miller et al. | | 348/83 |
| 7,199,348 B2 * | 4/2007 | Olsen et al. | | 250/208.1 |
| 7,641,402 B2 * | 1/2010 | Kocanda et al. | | 396/427 |
| 8,199,193 B2 | 6/2012 | Kolek | | |
| 8,219,247 B2 * | 7/2012 | Esmaili et al. | | 700/274 |
| 8,300,880 B2 * | 10/2012 | Esmaili et al. | | 382/100 |
| 8,334,513 B1 | 12/2012 | Garvey | | |
| 2009/0022422 A1 * | 1/2009 | Sorek et al. | | 382/284 |
| 2010/0310113 A1 | 12/2010 | Esmaili | | |
| 2013/0250144 A1 * | 9/2013 | Takayama | | 348/239 |
| 2014/0184781 A1 * | 7/2014 | Au et al. | | 348/83 |

FOREIGN PATENT DOCUMENTS

EP 2549352 A1 1/2013
JP 2013040714 A 2/2013

OTHER PUBLICATIONS

PCT International Search Report for PCT/US2014/045867, mailing date Oct. 27, 2014.

* cited by examiner

*Primary Examiner* — Ishrat I Sherali

(57) ABSTRACT

Methods, systems, and computer-readable and executable instructions are described herein. One method includes combining a plurality of images of a furnace into a composite image of the furnace, revising the composite image of the furnace to an intensity scaling, restoring a portion of the revised composite image of the furnace; and displaying a view of the restored revised composite image of the furnace to a user.

20 Claims, 7 Drawing Sheets

FURNACE VISUALIZATION

TECHNICAL FIELD

The present disclosure relates to methods, systems, and computer-readable and executable instructions for furnace visualization.

BACKGROUND

An operator of a furnace may learn the furnace internal conditions in order to control furnace settings and to achieve a threshold efficiency. An operator can learn this information by regular on-stream inspection of a furnace.

One on-stream inspection method is visual based inspection. Another method is based on thermal scanning of the furnace using a portable thermal camera. Both require manual operation by a trained operator. Many procedural missteps and/or variations can cause inaccurate or even erroneous analyses.

Additionally, an operator can observe the furnace using images taken from cameras installed at multiple locations of the furnace. The images can be provided to the operator in an orderly fashion on a single user interface or simultaneously on multiple user interfaces.

Interpreting the multiple images captured from different cameras to learn furnace internal conditions at a particular period of time has many unmet challenges. For example, one challenge is correct interpretation of each image. The order of the images can be based on a camera identification and/or camera location. In order to correctly interpret each image, the operator must be familiar with the furnace structure, the locations of the cameras, and the view aspects of the cameras to determine and interpret the content and context of each image.

For example, the multiple cameras can be placed at different elevations and angles to maximize the area of image coverage inside the furnace. An operator may need to know the geometry and camera placement to correctly interpret the images.

Further, each camera can have different parameter settings to achieve a particular contrast and maximize the dynamic range of intensity in each camera's field of view. The parameter settings can enable the capture of good images under diverse operating conditions. One such parameter setting for a static thermal camera is the temperature range. Parameter settings for a video camera can include aperture, shutter speed, and gain control. A furnace can operate at different temperatures in different portions of the furnace as required by various processes. Thus, a same intensity in two thermal images can have different thermal interpretations based on the parameter settings of the particular thermal cameras taking the thermal images. An operator may become confused when looking at the same area of a furnace with different intensities in different images and/or may take extra time to interpret the images.

Further, the plurality of cameras can have some common field of view coverage (e.g., image overlap). An operator may duplicate interpretation effort on the same area of the furnace multiple times in different images.

DETAILED DESCRIPTION

Figure 1:
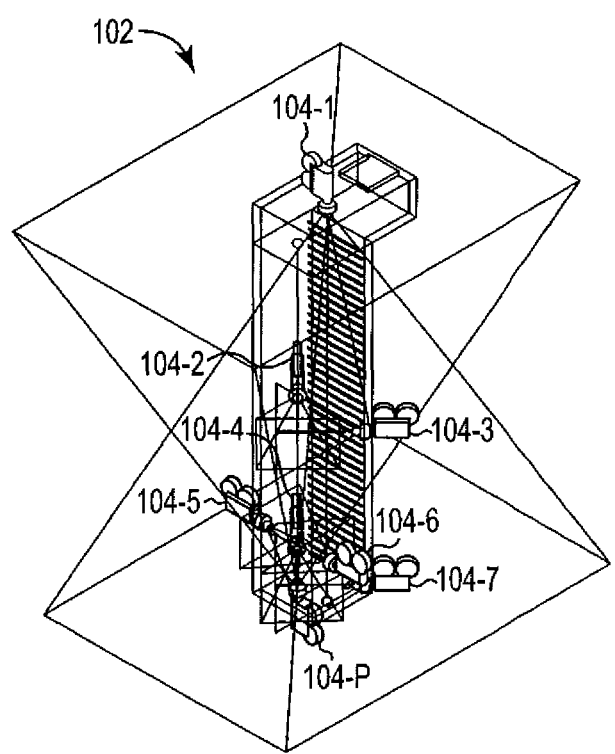
FIG. 1 illustrates a furnace and a plurality of imaging components for use with one or more embodiments of the present disclosure.

Methods, systems, and computer-readable and executable instructions for furnace visualization are described herein. For example, one or more embodiments can include combining a plurality of images of a furnace into a composite image of the furnace, revising the composite image of the furnace to an intensity scaling, restoring a portion of the revised composite image of the furnace, and displaying a view of the revised composite image to a user. For instance, a plurality of views of the furnace at various perspectives and at various locations can be displayed based on inputs of the user.

An operator can learn furnace internal conditions for control and efficiency of operation of the furnace by looking into furnace viewports and/or viewing images from imaging components (e.g., thermal cameras) installed at multiple locations of the furnace. Previous approaches to furnace visualization can include the operator viewing the images in an orderly fashion and/or simultaneously in order to interpret content and context from the images. However, in such an instance, the operator may need adequate knowledge of the imaging component placement, parameters, and/or settings of each imaging component to correctly interpret the content and context of the images.

For instance, each imaging component can have different intrinsic settings to achieve a particular contrast and range of intensity to capture one or more images of a furnace. Two images from different imaging components with overlap (e.g., portions of the two images are of the same area of the furnace) can have different intensities in the images for the same area of the furnace. An operator may become confused when looking at the same area in the two images that have different intensities. Thus, additional time may be spent by the operator to interpret the two images. And, the operator may duplicate interpretation efforts on an area of overlap. Thereby, previous approaches for furnace visualization can be frustrating for a user to use, can require adequate knowledge of the imaging components, and can be time consuming.

In contrast, embodiments of the present disclosure include furnace visualization methods, systems, and computer-readable and executable instructions that improve user efficiency and user experience as compared to previous approaches. Furnace visualization, in accordance with one or more embodiments, can include generating a furnace composite of the furnace from a plurality of images captured by imaging components. The furnace composite can include a single digital representation of the furnace formed from a plurality of captured images. In various embodiments, the furnace composite can have a uniform intensity scaling for ease of interpretation by a user.

In some embodiments, a variety of views of the furnace composite can be displayed. For instance, a user can select a particular view and, using the furnace composite, the particular view can be displayed to the user. Example views can include a holistic view of furnace surfaces and/or walls, a virtual viewport view, a particular location view, a structure overlay, and/or an image sequence, among other views (e.g., as discussed further herein).

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of objects" can refer to one or more objects. Additionally, the designator "N", "P" as used herein, particularly with respect to reference numerals in the drawings, indicate that a number of the particular features so designed can be included with a number of embodiments of the present disclosure.

FIG. 1 illustrates a furnace 102 and a plurality of imaging components 104-1, 104-2, 104-3, 104-4, 104-5, 104-6, 104-7 ... 104-P for use with one or more embodiments of the present disclosure. As discussed above, the furnace 102 can have a variety of different characteristics that may change the way that the images should be taken to provide a number of images of adequate quality for analysis of furnace condition. For example, some characteristics can include, the viewable area (e.g., field of regard) that can be captured by a particular imaging component, the depth of furnace surface to be viewed in focus (e.g., depends on the camera focal length and depth of focus), and/or the temperature of the furnace at the time the image is taken.

As illustrated in FIG. 1, the furnace 102 has a plurality of imaging components 104-1 ... 104-P that can view the furnace 102 through a number of view ports. As can be seen from the positioning of the imaging components 104-1 ... 104-P on the furnace 102, the imaging components 104-1 ... 104-P can be positioned in any suitable location and can provide a variety of images of the interior of the furnace 102.

The imaging components 104-1 ... 104-P utilized to capture the images can be any suitable image sensor or camera device. In some embodiments, an imaging component can be a video camera and video analytics can be performed on the captured images. The imaging components 104-1 ... 104-P can, for example, include thermal imaging components. An example thermal imaging component can include a thermographic camera and/or video device, and/or an infrared camera and/or video device, among other components.

Each of the imaging components 104-1 ... 104-P can be installed at known locations and perspective angles. That is, the field of view of each imaging component 104-1 ... 104-P can be known. A field of view of an imaging component, as used herein, can include an observable view of the imaging component at a particular position (e.g., an area of a furnace 102 that can be captured by an imaging component at a particular position). In addition, parameters (e.g., such as intrinsic settings) of each of the imaging components 104-1 ... 104-P can be known. The locations, perspective angles, and/or intrinsic settings of the imaging components 104-1 ... 104-P can be stored in memory (e.g., as discussed further herein) and associated with the appropriate imaging component.

Figure 2:
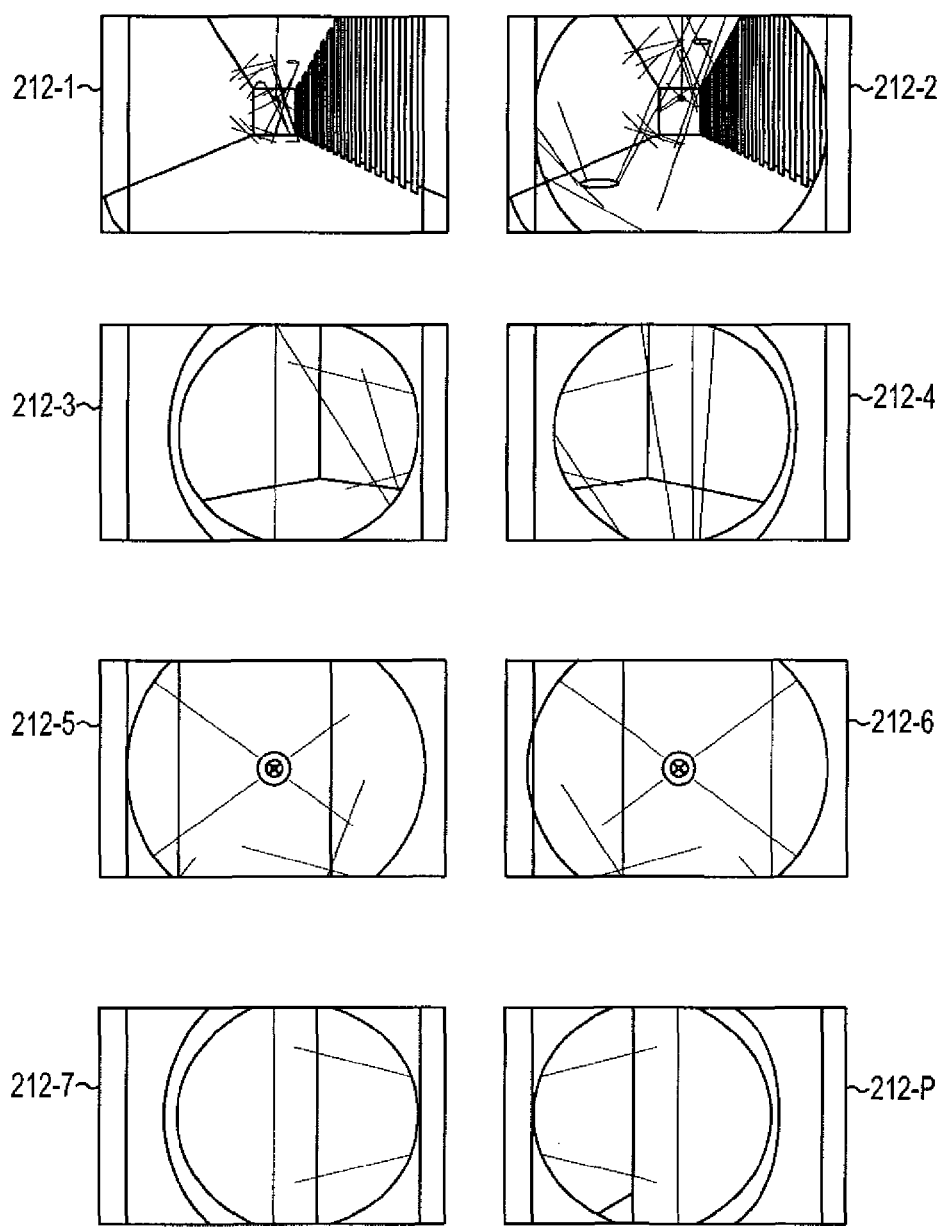
FIG. 2 illustrates several images showing different portions of a furnace that may be captured by a plurality of imaging components associated with the furnace in accordance with one or more embodiments of the present disclosure.

FIG. 2 illustrates several images 212-1, 212-2, 212-3, 212-4, 212-5, 212-6, 212-7 ... 212-P showing different portions of a furnace that may be captured by a plurality of imaging components associated with the furnace in accordance with one or more embodiments of the present disclosure. In accordance with embodiments of the present disclosure, each image (e.g., 212-1 ... 212-P) in FIG. 2 can correspond to an imaging component (e.g., 104-1 ... 104-P as illustrated in FIG. 1), although embodiments in accordance with the present disclosure are not so limited.

For instance, in various embodiments, a particular imaging component can capture one or more images. For example, images 212-1 and 212-2, of those shown in FIG. 2 can both have been captured using imaging component 104-1 of FIG. 1. For instance, image 212-1 may have been taken with the imaging component 104-1 illustrated in FIG. 1 oriented in a first position wherein the field of view is different than the orientation in which image 212-2 was taken wherein the imaging component 104-1 was in a second position. Accordingly, if the field of regard at a view port (e.g., a viewable area of the furnace at the view port) is larger than can be captured by the field of view of the imaging component, in some embodiments, the imaging component can move to multiple positions to capture more than one portion of the field of regard. The movement can, for instance, be automatic and/or without human intervention.

Each image (e.g., 212-1 ... 212-P) can, for instance, include a thermal image. A thermal image can be captured by a thermal component (e.g., an infrared camera and/or video device). In various examples, the plurality of images can include static images (e.g., a static picture), video streams, and/or a combination of both.

The plurality of images 212-1 ... 212-P, in various embodiments, can be stitched together to form a composite image of the furnace. For instance, the stitching of the images 212-1 ... 212-P can be based on parameters of each of the particular imaging components that captured the images 212-1 ... 212-P (e.g., as discussed further herein).

Figure 3:
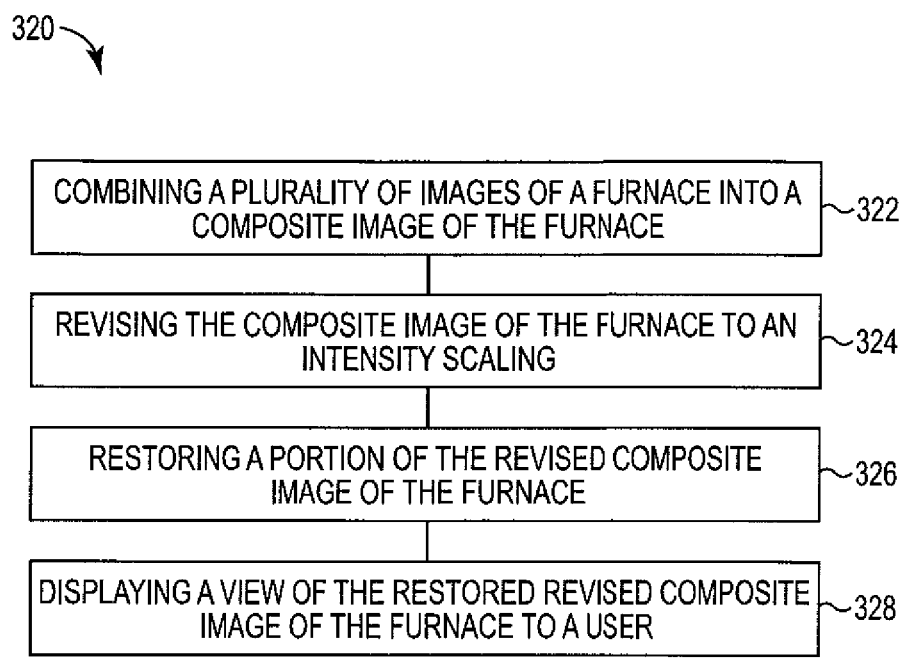
FIG. 3 illustrates an example of a method for furnace visualization in accordance with one or more embodiments of the present disclosure.

FIG. 3 illustrates a block diagram of an example method 320 for furnace visualization in accordance with one or more embodiments of the present disclosure.

At block 322, the method 320 can include combining a plurality of images of a furnace into a composite image of the furnace. Each image can be a portion of the furnace. For instance, combining the plurality of mages can include stitching the plurality of images with minimal area of overlap (e.g., minimal repetitions of portions of the furnace).

In accordance with some embodiments of the present disclosure, combining the plurality of images can include warping each of the plurality of images using a transformation matrix. The transformation matrix can be based on parameters of the imaging components that have captured the images. Parameters of an imaging component, as used herein, can include operational settings, intrinsic settings, and extrinsic settings. Example operational settings can include calibration, brightness, contrast (e.g., gain control) field of view range, and/or shutter speed, among other settings. Example intrinsic settings can include optical, geometrical, and digital characteristics of the imaging component, such as pixel resolutions, and focal length, among other settings. Example extrinsic settings can include imaging component placement (e.g., location), angle, and/or elevation, among other settings. For instance, the composite image can include a mosaicked image of the plurality of images that corresponds to an image captured using a wider field of view (e.g., a composite image).

At block 324, the method 320 can include revising the composite image of the furnace to an intensity scaling. The intensity scaling can include a uniform intensity scaling and/or uniform range of intensity scaling. The intensity scaling enables a uniform intensity to temperature mapping for the composite image. For instance, the revision can include image blending the composite image to the intensity scaling. Even though a dynamic range of the intensity of each imaging component is limited, say, to eight bits, the intensity dynamic range of the composite image can be set to that of a floating point number. Thus, the intensity scaling generates a dynamic range, which is significantly better than that of a particular imaging component. Rescaling of portions of the composite image to fit the dynamic range of a display monitor and/or printer can be performed at block 328. The portion of the composite image is selected based on a user's input (e.g. a requested view).

In various embodiments of the present disclosure, revising the composite image to an intensity scaling can include determining an intensity map associated with each of the plurality of images of the furnace. For instance, the intensity map can include a mapping of settings of an imaging component (e.g., intrinsic settings such as shutter speed and aperture) to a temperature output. The temperature output can include intensity output, temperature, and/or radiance. That is, a temperature output can include an output associated with the setting (e.g., a calibration) of an imaging component. The image blending can involve an intensity conversion derived using intensity mappings of the plurality of images.

For instance, each imaging component can be adjusted to operate at specific temperatures, in multiple specific temperature ranges, and/or with specific focus settings. The selection of at least one of the specific temperature, temperature ranges, and focus setting can be based on the location of the particular imaging component. For instance, the furnace can have areas that have different temperatures, and the same setting on an imaging component would be inadequate for taking images of different areas. The image blending can, for example, revise one or more portions of a composite image of the furnace by converting an intensity scaling of the one or more portions of the composite image to the intensity scaling (e.g., a uniform intensity scaling) using the plurality of intensity maps, thereby, maintaining the validity of information contained in the individual images.

In some embodiments, the image blending can, for instance, include an intensity conversion derived using a mapping of multiple intensity maps. For instance, the map can include image temperature outputs based on imaging component settings mapped to intensity-to-temperature maps of the plurality of imaging components. In some instances, the map can include image radiance outputs based on imaging component settings mapped to and intensity-to-radiance maps of the plurality of imaging components. Thereby, in various embodiments, revising the composite image can include generating a uniform intensity composite image of the furnace with a pixel intensity that includes a dynamic range covering the full dynamic range of a plurality of images and converting an intensity scaling of portions of the composite image using a plurality of maps, wherein each of the plurality of maps is associated with an intensity-temperature, intensity-radiance relation to operational settings of the plurality of imaging components.

At block 326, the method 320 can include restoring a portion of the revised composite image of the furnace. The restored revised composite image can include a furnace composite (e.g., a complete composite of the furnace with the intensity scaling and restored anomalies). The portion can, in various embodiments, include an anomalous portion of the revised composite image. For instance, an anomalous portion can include a degenerated image among the plurality of images and/or missing area among the plurality of images.

A degenerated image can, for instance, include an area and/or particular frame in an image (e.g., a thermal video) that has an impaired quality. For instance, a degenerated image can include an area and/or frame in a thermal image with a quality that is insufficient to determine intensity (e.g., thermal intensity) from the area and/or frame. A degenerated image can be revised by performing digital inpainting using pixel information from adjacent areas and/or frames. Digital inpainting, as used herein, can include the process of reconstructing lost or degenerated parts of static images and/or video streams using information from surrounding areas and/or frames to fill in the gap (e.g., use the intensity information from adjacent areas and/or frames to fill in the particular area and/or frame).

A missing area among the plurality of images can be caused by a blind spot. A blind spot can include an area of the furnace that is not captured by an imaging component. The loss of information due to the blind spot can be compensated using static images captured separately of that area. The intensity and/or image blending of the revised missing area can be performed using probabilistic approaches using intensity-temperature maps of areas visible in the images, for example. In-painting techniques can be applied, in some embodiments, to fill in the missing areas.

At block 328, the method 320 can include displaying a view of the restored revised composite image of the furnace (e.g., the furnace composite) to a user. The displayed view can include an image of a portion of the restored revised composite image of the furnace at a viewing perspective and location per user specification and/or request. Thereby, the view of the restored revised composite image displayed to a user can include an image displayed to the user. The view perspective and location can include, for instance, a view of the furnace. Example views can include a can include a holistic view of furnace surfaces and/or walls, a virtual viewport view, a particular location view, a structure overlay, and/or an image sequence, among other views, as discussed further herein.

For instance, the furnace composite can be displayed in a variety of views based on inputs by a user (e.g., as discussed further herein). The variety of views can include a variety of different field of views (FOV) of the furnace that are displayed using the furnace composite. A FOV of the furnace, as used herein, can include an observable view of the furnace at a given moment. Effective FOVs can be dependent on viewing geometry and orientation of each imaging component.

The user can include, for instance, an operator. For example, in response to user input indicating an intended view, the view of the furnace composite can be displayed.

In some embodiments, as illustrated in FIG. 4, FIGS. 5A-5B, and FIG. 6, the views can include a variety of views of a furnace. That is, the furnace illustrated in FIGS. 4-6 can include the same furnace from different views (e.g., FOV) and/or can include different views of a variety of furnaces, for instance.

Figure 4:
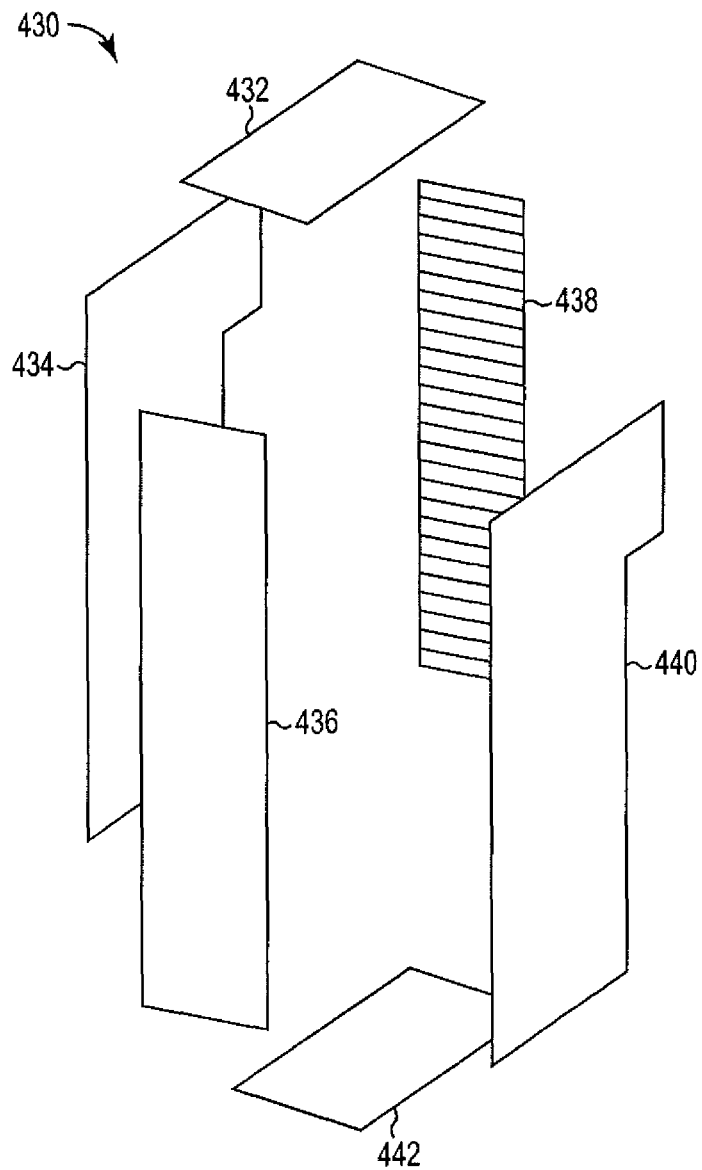
FIG. 4 illustrates a holistic view of surfaces of a furnace in accordance with one or more embodiments of the present disclosure.

FIG. 4 illustrates a holistic view 430 of surfaces of a furnace in accordance with one or more embodiments of the present disclosure. A holistic view 430, as illustrated by the embodiment of FIG. 4, can include sub-portions 432, 434, 436, 438, 440, 442 of the furnace. Example sub-portions can include furnace surfaces, walls, and/or floors. The sum of the sub-portions 432, 434, 436, 438, 440, 442 can include the general geometry of the furnace, for example.

As illustrated in FIG. 4, a tubular furnace can include six sub-portions 432, 434, 436, 438, 440, 442. The six sub-portions can include a set of four perpendicular walls 434, 436, 438, and 440 with a top surface 432 and a bottom surface 442. The holistic view 430 can, for instance, be displayed as an image in response to a user input.

Although the present embodiment illustrates a tubular furnace composed of six sub-portions, embodiments in accordance with the present disclosure are not so limited. Furnaces in accordance with one or more embodiments of the present disclosures can include variety of geometries.

In some embodiments, the holistic view 430 of the surfaces of the furnace can be obtained using one or more images of the furnace and/or computer-aided-design (CAD) data. CAD data can include computer-readable (e.g., digital) representation of an object (e.g., the furnace). For instance, CAD data can include a two-dimensional and/or three-dimensional representation of structural components (e.g., sub-components, surfaces, walls, etc.) of an object. Thus, the structural data from the CAD can be overlaid on the images of the furnace to present detailed information to the user.

Figure 5A:
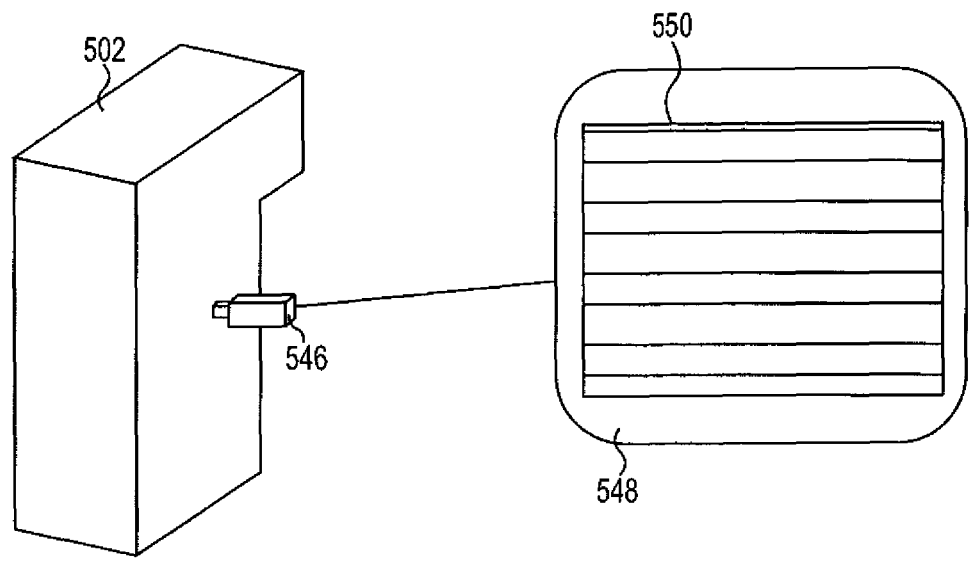
FIG. 5A illustrates an image of a furnace from a field of view of a virtual view port in accordance with one or more embodiments of the present disclosure.

FIG. 5A illustrates an image 550 of a furnace 502 from a FOV of a virtual view port in accordance with one or more embodiments of the present disclosure. A view port can include a port accessible for viewing the interior of a furnace 502. A virtual view port, as used herein, can include an image obtained from a virtual FOV. For instance, the virtual FOV can be from a virtual imaging component 546. The image provided can be from the FOV and orientation of the virtual imaging component 546 placed at the location of the virtual view port.

In actuality, the displayed image 550, from the virtual imaging component 546, presented to the user consists of a specific region of interested in the revised composite image. The displayed image 550 may be constructed from images captured using one imaging component but viewed at different perspectives from more than one imaging components. The selected region of interest to be displayed can depend upon the parameter of the imaging components, including location of the imaging components, FOV angles, etc.

A user can specify the location of the virtual view port (e.g., a specific region of interest). For instance, the location of the virtual view port and the FOV of the virtual imaging component 546 can be in response to one or more inputs by the user. An input can include an indication of the location. For instance, an image from a virtual view port can be displayed as if captured from the virtual view port for the furnace by the virtual imaging component 546 based on the user input.

As illustrated by FIG. 5A, in response to the input from the user, a display of the image 550 of the composite furnace can be provided. The image 550 illustrated can include an image as if it were captured by the virtual imaging component 546 at the virtual view port. The display of the image 550 can be provided on a user interface 548.

A user interface 548 can, for example, include a space where interactions between a user and a computing device occur (e.g., allows a user to interact with a computing device using images and/or text). A user interface 548 can include hardware components and computer instruction components. For instance, hardware components can include input components (e.g., a mouse, a touch screen, and a keyboard) and output components for the computing device to indicate the effects of user input (e.g., display). An example user interface c548 an include a graphical user interface (GUI). A GUI can, for example, represent actions and tasks available to a user through graphical icons and visual indicators.

Figure 5B:
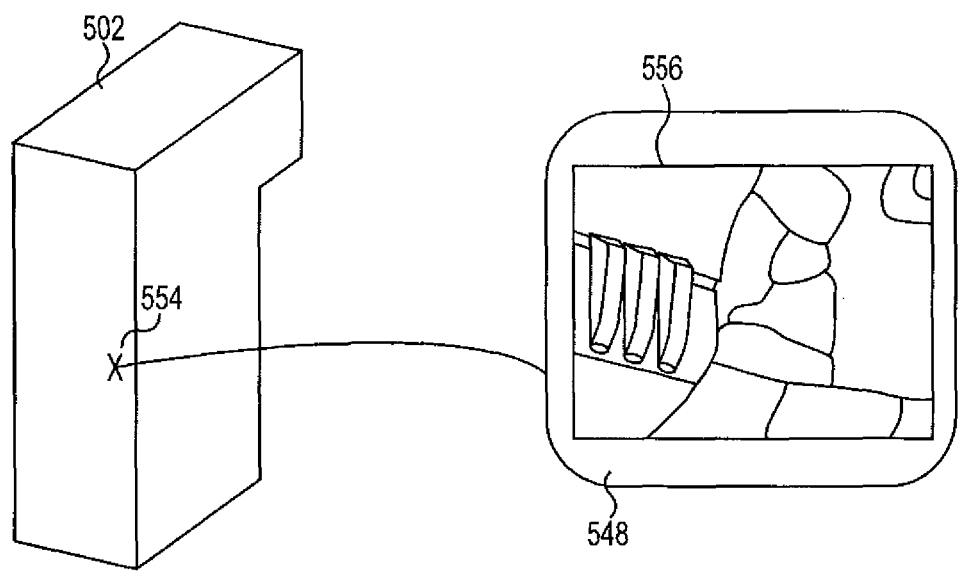
FIG. 5B illustrates an image of a furnace from a field of view of a particular furnace location in accordance with one or more embodiments of the present disclosure.

FIG. 5B illustrates an image 556 of a furnace 502 from a FOV of a particular furnace location 554 in accordance with one or more embodiments of the present disclosure. Similarly to a virtual view port illustrated in FIG. 5A, a user can specify a particular furnace location 554 and area.

For instance, the particular furnace location 554 and area can be based on a center (e.g., as illustrated by the X) and a boundary (e.g., an area) as specified by the user. The image 556 of the furnace 502 can, for example, be provided as if the image 556 were captured by a virtual camera at a virtual view port (e.g., not illustrated in FIG. 5B).

As illustrated by FIG. 5B, in response to the input from the user specifying the particular furnace location 554, a display of the image 556 of the composite furnace can be provided. The display of the image 556 can include an image as if captured from a virtual camera at the particular furnace location 554 and can have a FOV defined based on the specified furnace location 554 and area (e.g., boundary). The display of the image 556 can be provided on a user interface 548.

In various embodiments, a particular furnace location (e.g., particular furnace location 554) can be input by a user based on movement of a mobile device. A particular furnace location based on movement of a mobile device can include, for example, a walk through view. For instance, the user interface 548 can be associated with a mobile device (e.g., a mobile cellular telephone, a portable computer, and/or a tablet, among other devices). The mobile device can be operable to determine a location of the mobile device utilizing a positioning component and determine an orientation of the mobile device utilizing an orientation component of mobile device. An example positioning component can include a Global positioning system (GPS) sub-component and an orientation component can include an accelerometer sub-component, and/or a gyrometer sub-component.

For instance, an image (e.g., image 556) of the furnace composite can be displayed (e.g., a walk through view) based on the determined location, orientation, and an input from a user. The input from the user can include movement of the mobile device. For instance, an orientation of the device can be determined using an accelerometer sub-component, and/or a gyrometer sub-component. Using the determined location and orientation, a particular furnace location 554 can be identified and a display of an image 556 from the FOV of the particular furnace location can be provided on the user interface 548 of the device.

As an example, a user with a mobile device containing the user interface 548 can move to a location near the particular furnace location 554 illustrated in FIG. 5B. The mobile device can determine the location of the user using GPS and/or other global tracking techniques. The user can move the mobile device to be oriented toward the particular furnace location 554. The movement can include an input by the user. For instance, orienting the mobile device can include pointing the mobile device toward the location (e.g., particular furnace location 554). The mobile device can determine an orientation of the mobile device using measurements from an accelerometer sub-component and/or a gyro meter sub-component. An image 556 of the furnace composite from the FOV of the particular furnace location 554 can be displayed based on the determined location, orientation, and user input (e.g., movement of the mobile device).

Figure 6:
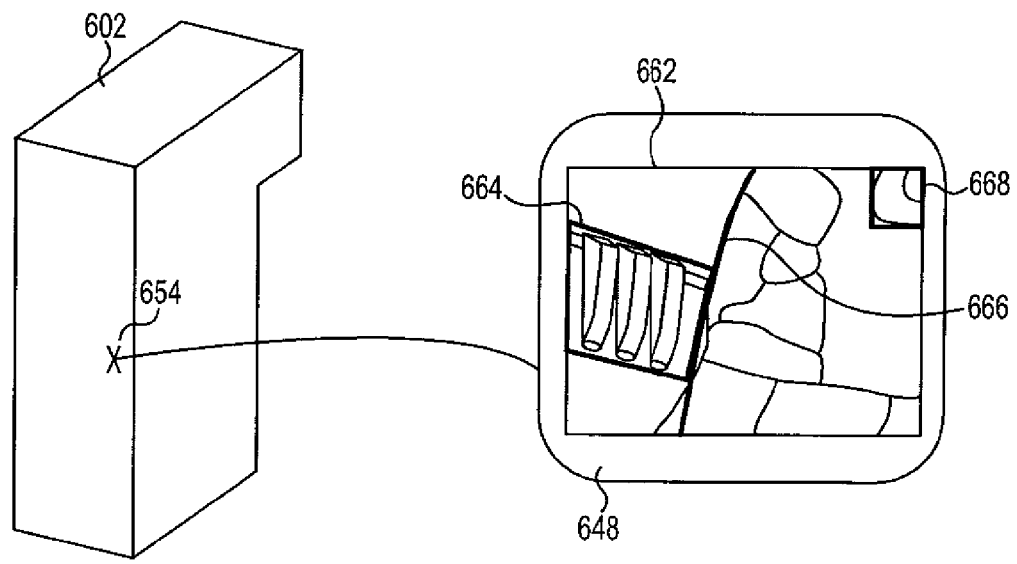
FIG. 6 illustrates an image of a furnace from the field of view of a user specified furnace location in accordance with one or more embodiments of the present disclosure.

FIG. 6 illustrates an image 662 of a furnace 602 from the FOV of user specified furnace location 654 in accordance with one or more embodiments of the present disclosure. The user specified furnace location 654 can include a particular furnace location and area and/or a virtual view port. The resulting view of the furnace can be displayed from the FOV of the user specified furnace location 654 using images of the specified area (e.g., as described above with regard to FIGS. 5A and 5B).

In various embodiments, the user specified furnace location 654 illustrated in FIG. 6 can include the particular furnace location 554 illustrated in FIG. 5B, although embodiments in accordance with the present disclosure are not so limited. For example, in some embodiments the user specified location 654 can include a different location than the particular furnace location 554.

In accordance with one or more embodiments, an image 662 of the furnace 602 can be provided that includes a structure overlay including superimposed furnace structural information 664, 666, 668 over the furnace composite. The superimposed furnace structural information 664, 666, 668 can be from an input structural diagram of the furnace (e.g., obtained from a CAD). The structure overlay can assist a user in locating abnormalities as the location of different structural components is overlaid on the image. Example structural components can include wall boundaries, burners, and/or pipes, among other components.

For instance, a user can specify a furnace location 654 and indicate to include structure overlay. As illustrated in FIG. 6, in response to the input from the user, a display of the image 662 of the composite furnace can be provided. The display of the image 622 can include an image 662 as if captured from a virtual camera at the user specified furnace location 654 and can have a FOV defined based on the user specified furnace location 654. The display of the image 662 can include superimposed furnace structural information (e.g., 664, 666, and 668). The superimposed furnace structural information 664, 666, 668, as illustrated in FIG. 6, can include a burner 664, a wall boundary 666, and a view port 668. The display of the image 662 can be provided on a user interface 648.

In some embodiments, a user may interact with the structural overlay process by identifying where the center of the burner 664 is (e.g., the X illustrated in FIG. 6). That is, the center of the FOV and/or the location of the virtual view port can be based on the user identifying the center of a burner. Alternatively and/or in addition, the center of the burner 664 can be identified automatically.

In accordance with various embodiments of the present disclosure, a display of an image 662 of the furnace composite can be provided that includes an image sequence. An image sequence can include a spatial and/or temporal sequence of the furnace composite over a period of time. That is, each sequence (e.g., sub-period of time) in the period of time can consist of a plurality of images which are generated based on a user specified trajectory and/or range of time.

For example, assume images in a spatial sequence are the integrated views of the furnace rotating 360 degrees at a 2 degree interval along the central axis of a furnace. An example image sequence can include images of integrated view from date 1 (mmddyy) at time 1 (hh:mm:ss) to date 2 (mmddyy) at time 2 (hh:mm:ss). The integrated view can include an image of the furnace composite as described in FIGS. 5A-5B, and FIG. 6, in various embodiments. The furnace composite can maintain the intensity scale (e.g., uniform intensity scaling) across the integrated images.

Figure 7:
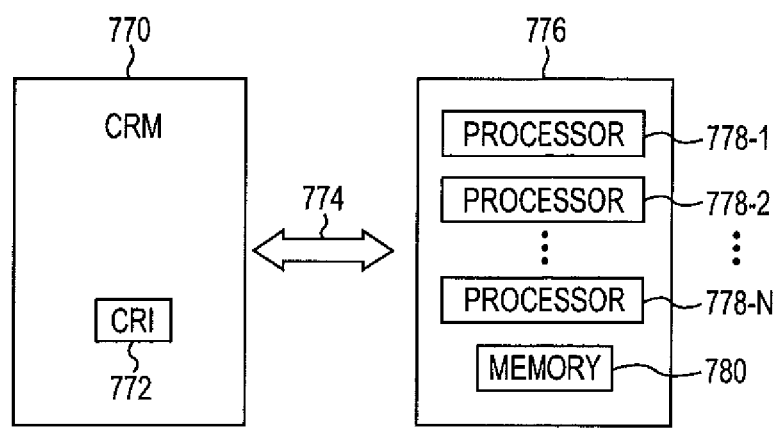
FIG. 7 illustrates a block diagram of an example of a system in accordance with one or more embodiments of the present disclosure.

FIG. 7 illustrates a block diagram of an example of a system in accordance with one or more embodiments of the present disclosure. As shown in the embodiment of FIG. 7, the system includes a computer-readable medium (CRM) 770 in communication with processing resources 778-1, 778-2 . . . 778-N.

CRM 770 can be in communication with a device 776 (e.g., a Java® application server, a mobile device, among others) having processing resources 778-1, 778-2 . . . 778-N. The device 776 can be in communication with a tangible non-transitory CRM 770 storing a set of computer-readable instructions (CRI) 772 executable by one or more of the processing resources 778-1, 778-2 . . . 778-N, as described herein. The CRI 772 can also be stored in remote memory managed by a server and represent an installation package that can be downloaded, installed, and executed. The device 776 can include the memory resource 780, and the processing resources 778-1, 778-2 . . . 778-N can be coupled to the memory resource 780.

Processing resources 778-1, 778-2 . . . 778-N can execute CRI 772 that can be stored on an internal or external non-transitory CRM 770. The processing resources 778-1, 778-2 . . . 778-N can execute CRI 772 to perform various functions. For example, the processing resources 778-1, 778-2 . . . 778-N can execute CRI 772 to combine a plurality of images of a furnace into a composite image based on parameters of a plurality of imaging components.

A non-transitory CRM (e.g., CRM 770), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 770 can also include distributed storage media. For example, the CRM 770 can be distributed among various locations.

The non-transitory CRM 770 can be integral, or communicatively coupled, to a computing device, in a wired and/or a wireless manner. For example, the non-transitory CRM 770 can be an internal memory, a portable memory, a portable disk, or a memory associated with another computing resource (e.g., enabling CRIs to be transferred and/or executed across a network such as the Internet).

The CRM 770 can be in communication with the processing resources 778-1, 778-2 . . . 778-N via a communication path 774. The communication path 774 can be local or remote to a machine (e.g., a computer) associated with the processing resources 778-1, 778-2 . . . 778-N. Examples of a local communication path 774 can include an electronic bus internal to a machine (e.g., a computer) where the CRM 770 is one of volatile, non-volatile, fixed, and/or removable storage medium in communication with the processing resources 778-1, 778-2 . . . 778-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 774 can be such that the CRM 770 is remote from the processing resources e.g., 778-1, 778-2 . . . 778-N such as in a network relationship between the CRM 770 and the processing resources (e.g., 778-1, 778-2 . . . 778-N). That is, the communication path 774 can be a network relationship. Examples of such a network relationship can include a local area network (LAN), wide area network (WAN), personal area network (PAN), and the Internet, among others. In such examples, the CRM 770 can be associated with a first computing device and the processing resources 778-1, 778-2 . . . 778-N can be associated with a second computing device (e.g., a Java® server, a mobile device, etc.). For example, a processing resource 778-1, 778-2 . . . 778-N can be in communication with a CRM 770, wherein the CRM 770 includes a set of instructions and wherein the processing resource 778-1, 778-2 . . . 778-N is designed to carry out the set of instructions to generate a furnace composite.

The system, in accordance with various embodiments, can include and/or be a portion of a furnace visualization system. For instance, a furnace visualization system can include a plurality of imaging components, a computing component, and a display component.

The plurality of imaging components can be operated to capture a plurality of images of a furnace. Each of the plurality of images captured can include an image of a portion of the furnace. The imaging components can communicate with the computing component. For instance, the communication can include a wireless and/or wired communication. Example communications can include captured images, outputs of the imaging devices (e.g., temperature outputs), and/or parameters of the imaging device, among other information.

The computing component can be operated to receive and/or retrieve the plurality of images of the furnace from the plurality of imaging components, among other functions described herein. For instance, processing resources 778-1, 778-2 . . . 778-N coupled to the memory resource 780 can combine the plurality of images of the furnace into a composite image based on parameters of the plurality of imaging components. The parameters can include operational settings, intrinsic settings, and/or extrinsic settings of the imaging components, for example.

In various embodiments, having the images in a particular sequence (e.g., sequential order) and/or knowing the sequential order can allow the combining process (e.g., stitching operation) to be done more efficiently than a random order. Whether in order or not, the location information of each imaging component can provide helpful information to put the images in the correct order.

The processing resources 778-1, 778-2 . . . 778-N coupled to the memory resource 780 can determine an intensity map that converts an intensity of each of the plurality of images into a uniform range based on settings of each of the plurality of imaging components. The uniform range can include a uniform intensity range, temperature range and/or radiance range, in various embodiments. The intensity map can include the mapping of multiple intensity maps (e.g., as further discussed in regards to FIG. 3).

The parameters and/or settings of each of the plurality of imaging components can, in accordance with some embodiments of the present disclosure, be stored in memory (e.g., internal to the system and/or accessible by the system) as data that is accessible by the system. For instance, computer-executable instructions (e.g., CRI 772) can associate data stored in memory with a particular imaging component and provided that data to a processing resource (e.g., processing resources 778-1, 778-2 . . . 778-N) within the system to combine the plurality of images of the furnace into a composite image and/or determine the intensity map. The intensity map can be determined in advanced, in response to capturing a plurality of images, and/or in response to an input by a user. Thereby, in some embodiments, the intensity map can include a stored parameter (e.g., an intrinsic setting) of a particular imaging component.

The processing resources 778-1, 778-2 . . . 778-N coupled to the memory resource 780 can image blend the composite image using the determined intensity map on each of the plurality of images. For instance, image blending can include revising the composite image to a uniform intensity scale using the determined intensity map (e.g., each image has an associated intensity map).

The processing resources 778-1, 778-2 . . . 778-N coupled to the memory resource 780 can restore an anomalous portion of the image blended composite image to generate a furnace composite. In various embodiments, multiple anomalous portions can be restored. The restoration can include digital inpainting. For instance, a degenerated and/or missing area can be restored using digital inpainting techniques.

A display component of the furnace visualization system can be operated to display an image of the furnace composite based on one or more inputs by a user. A furnace composite, as used herein, can include a revised restored composite image of the furnace. The one or more inputs can be associated with a particular view and/or image of the furnace to display to the user.

Any of the above information, data, and/or images can be saved along with the plurality of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for furnace visualization, comprising:
   combining a plurality of images of a furnace into a composite image of the furnace;
   revising the composite image of the furnace to an intensity scaling;
   restoring a portion of the revised composite image of the furnace; and
   displaying a view of the restored revised composite image of the furnace to a user.

2. The method of claim 1, wherein combining the plurality of images includes stitching the plurality of images with minimal area of overlap.

3. The method of claim 1, wherein combining the plurality of images includes warping each of the plurality of images using a transformation matrix.

4. The method of claim 3, including determining the transformation matrix using operational, intrinsic, and extrinsic parameters of a plurality of imaging devices.

5. The method of claim 1, wherein revising the composite image of the furnace to the intensity scaling includes:
   generating a uniform intensity composite image of the furnace with a pixel intensity that includes a dynamic range covering the full dynamic range of a plurality of imaging components that capture the plurality of images; and
   converting an intensity scaling of portions of the composite image using a plurality of intensity maps, wherein each of the plurality of intensity maps is associated with an intensity-temperature, intensity-radiance relation to operational settings of the plurality of imaging components.

6. The method of claim 1, where restoring the portion of the revised composite image includes restoring a degenerated image among the plurality of images.

7. The method of claim 1, wherein restoring the portion of the revised composite image includes restoring a missing area from the plurality of images of the furnace.

8. The method of claim 1, wherein displaying the view of the restored revised composite image of the furnace includes displaying at least one of:
   a holistic view of sub-portions of the furnace;
   a virtual viewport view of a virtual camera;
   a particular location view;
   a structure overlay view;
   a walk through view; and
   a sequence view.

9. A non-transitory computer-readable medium storing instructions executable by a processing resource to:
   generate a furnace composite including instructions executable to:
      combine a plurality of images of portions of a furnace into a composite image of the furnace based on parameters of a plurality of imaging components that captured the plurality of images;
      revise the composite image of the furnace to an intensity scaling; and
      restore an anomalous portion of the revised composite image to generate the furnace composite; and
      display an image of the furnace composite to a user based on an input from the user.

10. The medium of claim 9, wherein the instructions executable to revise the composite image include instructions executable to map image intensity outputs based on an imaging component setting.

11. The medium of claim 9, wherein the instructions executable to revise the composite image include instructions executable to map image temperature outputs based on imaging component settings and intensity-to-temperature maps of the plurality of imaging components.

12. The medium of claim 9, wherein the instructions executable to revise the composite image include instructions executable to map image radiance outputs based on imaging component settings and intensity-to-radiance maps of the plurality of imaging components.

13. The medium of claim 9, wherein the instructions executable to display the image of the furnace composite include instructions executable to display a holistic view of a plurality of furnace surfaces.

14. The medium of claim 9, wherein the instructions executable to display the image of the furnace composite include instructions executable to display the image as if captured from a virtual view port of the furnace by a virtual imaging component based on the user input, wherein the virtual view port includes a virtual field of view of a user specified location of the furnace.

15. The medium of claim 9, wherein the instructions executable to display the image of the furnace composite include instructions executable to display a structure overlay including superimposed furnace structural information over the furnace composite.

16. The medium of claim 9, wherein the instructions executable to display the image of the furnace composite include instructions executable to display an image sequence, wherein the image sequence includes a spatial sequence of the furnace composite over a period of time.

17. A furnace visualization system, comprising:
   a plurality of imaging components operated to capture a plurality of images of a furnace, wherein each of the plurality of images includes an image of a portion of the furnace;
   a computing component operated to:
      combine the plurality of images of the furnace into a composite image based on parameters of the plurality of imaging components;
      determine an intensity map that converts the intensities of each of the plurality of images into a uniform range based on settings of each of the plurality of imaging components;
      image blend the composite image using the determined intensity map on each of the plurality of images; and
      restore an anomalous portion of the image blended composite image to generate a furnace composite; and
   a display component operated to display a view of the furnace composite based on an input by a user.

18. The system of claim 17, wherein the computing component operated to restore the anomalous portion of the image blended composite image is operated to restore the anomalous portion using pixel information from adjacent frames.

19. The system of claim 17, wherein the computing component operated to restore the anomalous portion of the image blended composite image is operated to restore a missing area using static images captured of the missing area.

20. The system of claim 17, wherein the display is associated with a mobile device, and wherein the mobile device is operable to:

determine a location of the mobile device utilizing a positioning component of the mobile device;
determine an orientation of the mobile device utilizing an orientation component of the mobile device; and
display the view of the furnace composite based on the determined location, orientation, and the user input.

* * * * *

UNITED STATES PATENT AND TRADEMARK OFFICE
CERTIFICATE OF CORRECTION

PATENT NO. : 9,127,891 B2
APPLICATION NO. : 13/938940
DATED : September 8, 2015
INVENTOR(S) : Au et al.

It is certified that error appears in the above-identified patent and that said Letters Patent is hereby corrected as shown below:

On The Title Page, Item (72) Inventors should read

--Kwong Wing Au, Bloomington, MN (US),
Sharath Venkatesha, Minnetonka, MN (US),
Matthew Martin, Tulsa, OK (US),
Kurt Kraus, Tulsa, OK (US)--

Signed and Sealed this
Fifteenth Day of March, 2016

Michelle K. Lee
*Director of the United States Patent and Trademark Office*